Jan. 16, 1962 K. L. BERNINGER 3,017,029
SELF-CLEANING FILTER
Filed Jan. 30, 1957 2 Sheets-Sheet 2

INVENTOR.
Kenneth L. Berninger
BY
D.C. Staley
HIS ATTORNEY

United States Patent Office 3,017,029
Patented Jan. 16, 1962

3,017,029
SELF-CLEANING FILTER
Kenneth L. Berninger, Dayton, Ohio, assignor to General Motors Corporation, Detroit, Mich., a corporation of Delaware
Filed Jan. 30, 1957, Ser. No. 637,305
8 Claims. (Cl. 210—108)

This invention relates to a filter, and particularly to a filter of the self-cleaning type.

Heretofore, it has been proposed to construct a filter for liquids including means for automatically cleaning the filter during its operation. The automatic, or self-cleaning means comprises a back-wash flow arrangement whereby a portion of the liquid filtered, or liquid from an external source, is caused to flow in the reverse direction through the filter screen, or other filter media, so as to remove the sediment separated from the liquid flowing through the filter media. In other filtering apparatus, the filter screen is scraped, or brushed, to remove the sediment separated from the liquid passing therethrough. Moreover, it has been proposed to drive a back-wash nozzle by an electric motor in the case of a back-wash cleaning apparataus, and to drive a scraper by means of a turbine impeller which derives its power from the liquid passing through the filter.

The present invention relates to an improved self-cleaning filter including means for back-washing the filter screen and additional means for filtering the back-wash flow and removing the sediment from the back-wash filtering media. In the present invention the power for actuating both a back-wash nozzle and the cleaning means for the back-wash filter is derived from the liquid flowing through the filter by a turbine impeller designed to maintain a substantially constant speed irrespective of variations in the rate of liquid flow through the filter above a predetermined minimum rate of flow. Accordingly, among my objects are the provision of a self-cleaning filter including means for back-washing the primary filter media and means for filtering the back-wash flow; the further provision of means for removing the sediment from the back-wash filtering media and collecting the sediment in a sump; the further provision including impeller means for driving the self-cleaning elements of the filter at a substantially constant speed when the fluid flow through the filter is equal to or exceeds a predetermined flow rate; and the still further provision of a self-cleaning filter of the aforesaid type including a resilient drive between the impeller and the self-cleaning elements.

The aforementioned and other objects are accomplished in the present invention by incorporating an axial flow impeller in the inlet side of the fuel filter, for actuating the self-cleaning elements of the filter apparatus. Specifically, the filter comprises a generally cylindrical housing, one end of which is closed by a cap, or head, and the other end of which has a sump attached thereto. The housing has an inlet opening, an outlet opening and a back-wash outlet opening. The inlet opening connects with an impeller nozzle within which an axial flow impeller is disposed. The axial flow impeller is mounted for rotation on a shaft and is spring biased into engagement with a conical nose formed on the end of the shaft. The impeller is drivingly connected with the shaft through the spring, the spring also being employed to maintain the speed of impeller rotation substantially contant by allowing axial movement of the impeller relative to the shaft, when the inlet flow rate is above, or exceeds, a predetermined minimum flow rate.

The incoming liquid to be filtered passes through a screen which is supported on a drum having a plurality of circumferentially spaced elongated slots. After the liquid flows through the filter screen it is exhausted through the outlet opening. In the event that the screen becomes clogged, a bypass valve is incorporated in the filter housing, and comprises a pressure responsive valve which opens to directly interconnect the inlet and outlet openings of the fuel filter when the pressure differential between the inlet and outlet openings exceeds a predetermined value.

The impeller driven shaft is connected through reduction gearing to a shaft mounted coaxially within the drum. This shaft carries a back-wash nozzle which communicates with the slots in the drum, and through which a portion of the filtered liquid flows in the reverse direction through the screen to remove the sediment therefrom. This back-wash fluid flows downwardly through the shaft and is discharged against a filter plate having a plurality of small perforations of frusto conical cross-section. The back-wash flow passes through the filter plate and the sediment, or a substantial portion of the sediment, is removed therefrom by this plate. Thereafter the back-wash liquid flows through the back-wash outlet of the filter housing and may be circulated again through the inlet opening of the filter.

In order to clean the back-wash filter plate, the shaft is drivingly connected to a plate which carries a plurality of wire brushes which engage the plate and remove the sediment therefrom. This sediment accumulates in the sump detachably connected to the cylindrical housing so that at periodic intervals the sump may be removed and cleaned.

Further objects and advantages of the present invention will be apparent from the following description, reference being had to the accompanying drawings wherein a preferred embodiment of the present invention is clearly shown.

Figure 1:
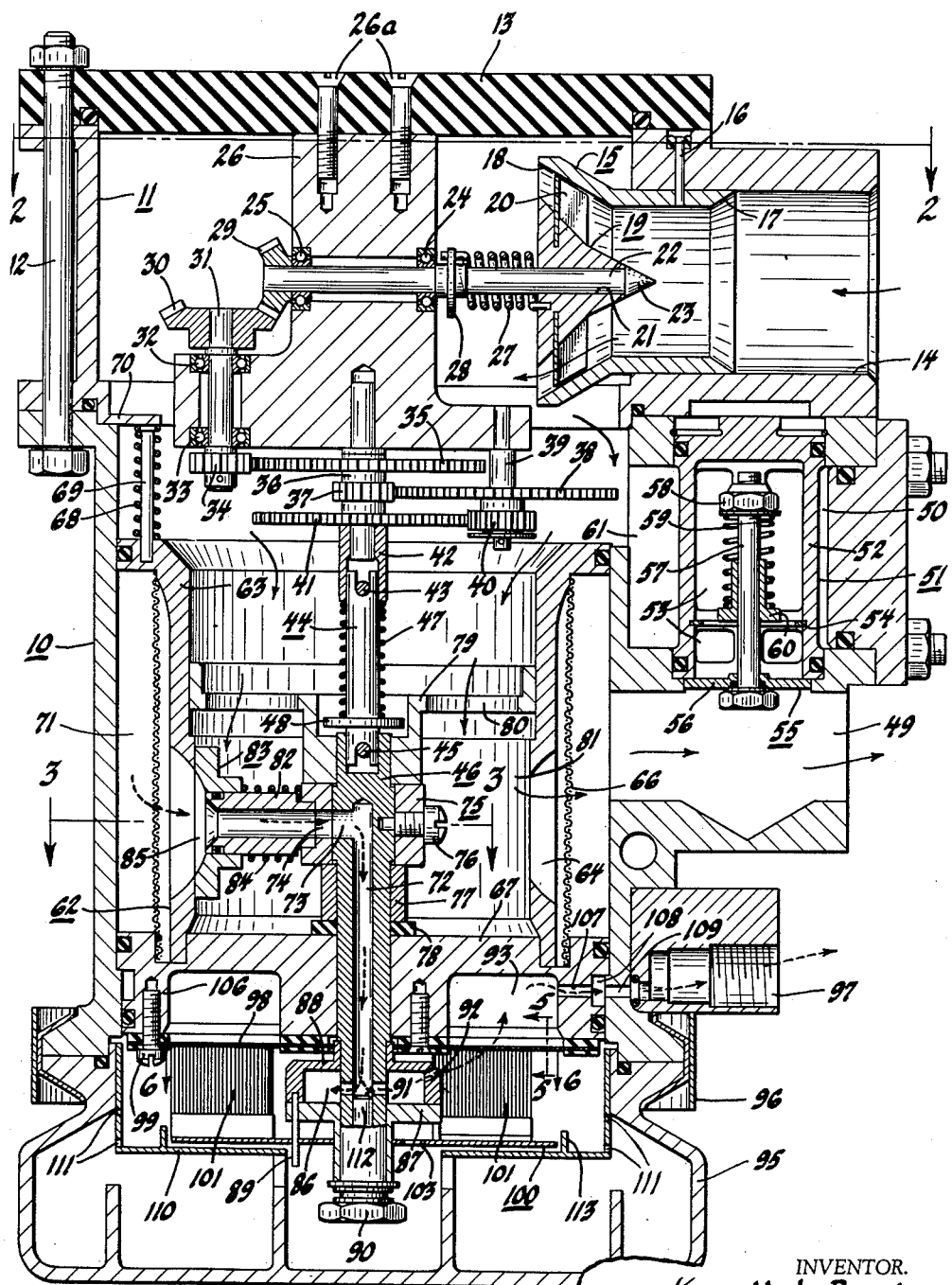
FIGURE 1 is a vertical cross-section of a filter constructed according to this invention.

With particular reference to FIGURE 1, the filter includes a substantially cylindrical housing 10 having flanged open ends. An annular inlet member 11 is attached to the upper flange of the housing 10 by means of a plurality of tie bolts such as indicated by 12, the tie bolts also securing a head member 13 in place. The annular inlet member 11 is formed with an inlet port, or opening, 14 through which fluid to be filtered flows. A nozzle 15 is connected by means of a pin 16 within the inlet opening 14. The turbine nozzle 15 includes a converging inlet 17 and a diverging outlet portion 18.

Figure 2:
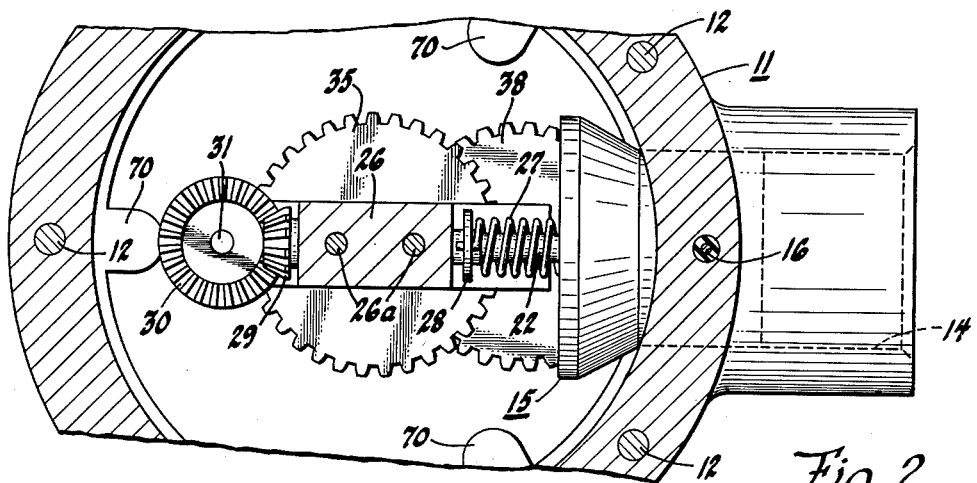
FIGURE 2 is a fragmentary sectional view taken along line 2—2 of FIGURE 1.

An axial flow turbine impeller 19 having a plurality of blades 20 is disposed within the diverging outlet portion 18 of the nozzle 15. Referring particularly to FIGURES 1 and 2, the turbine impeller 19 includes a hub having an axial through bore 21. The blades 20 are suitably secured to the hub of the impeller 19 such as by press fitting the blades into slots in the hub as shown in FIGURE 1.

The impeller 19 is rotatably journalled on a shaft 22 which extends through the bore 21 thereof and is formed with a conical nose portion 23 against which the forward portion of the impeller abuts so as to limit movement of the impeller to the right as viewed in FIGURE 1. The shaft 22 is rotatably journalled by spaced bearings 24 and 25 in a support member 26 which is attached to the cover 13 by screws 26a carried by the cover. The impeller 19 is drivingly connected with the shaft 22 through a spring 27, one end of which is attached to the impeller 19 and the other end of which extends into a slot formed on a shoulder 28 integral with the shaft 22. The spring 27 serves a dual function, namely, to drivingly interconnect the impeller 19 and the shaft 22, and to allow axial movement of the impeller 19 to the left as viewed in FIGURE 1 so that the shaft 22 will be driven at a substantially constant speed irrespective of variations in the rate of fluid flow through the inlet opening 15 above a predetermined flow rate. Thus, the springs 27 constitute a driving spring and a governor spring.

The shaft 22 has affixed thereto a bevel gear 29 which meshes with a bevel gear 30 attached to a shaft 31, the shaft 31 being journalled by bearings 32 and 33 in the member 26. The shaft 31 has also attached thereto a pinion gear 34 which meshes with gear 35, the gear 35 being attached to a stub shaft 36 and having attached thereto a pinion gear 37. The pinion gear 37 meshes with a gear 38 attached to a shaft 39, the shaft 39 also having attached thereto a pinion gear 40. The pinion gear 40 meshes with a gear 41 having an integral collar 42 which is connected by means of a pin 43 with a shaft 44. The gears 29, 30, 34, 35, 37, 38, 40 and 41 constitute a reduction gearing unit so that the shaft 44 will be driven at a relatively slow velocity as compared to the shaft 22. The shaft 44 is connected by means of a pin 45 with a shaft 46. In addition, the shaft 44 is biased downwardly by means of a spring 47, opposite ends of which engage the collar 42 and a shoulder 48 formed on the shaft 44.

The housing 10 also includes an outlet opening or port, 49 and a bypass valve chamber 50. Within the chamber 50, a bypass valve assembly 51 is disposed comprising a guide 52 having a plurality of openings 53 and carrying a snap ring 54. A valve element 55 is disposed within the guide 52 and includes a head portion 56 which is attached to a stud 57 having a nut 58. The stud 57 is encompassed by a spring 59, one end of which engages the nut 58, and the other end of which engages a flanged sleeve 60 which is seated against the snap ring 54. The spring 59 normally maintains the head portion 56 in contact with the seat portion of the valve guide 52 thereby preventing flow of fluid from the inlet opening 14 through the opening 61 of the bypass valve to the outlet opening 49 when the pressure differential between the fluid at the inlet and outlet openings is less than a predetermined value. The openings 53 in the valve guide 52 are connected at all times to the opening 61. However, when the pressure differential between the inlet and outlet opening exceeds the predetermined value, the incoming fluid acting on the upper side of the head portion 56 will overcome the closing force of the springs 59 so as to open the bypass valve and permit the flow from the inlet port 14 through the opening 61, the openings 53 to the outlet port 49.

Figure 3:
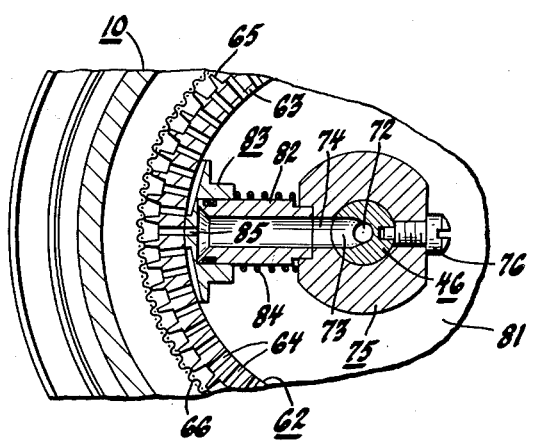
FIGURE 3 is a fragmentary sectional view taken along line 3—3 of FIGURE 1.
Figure 4:
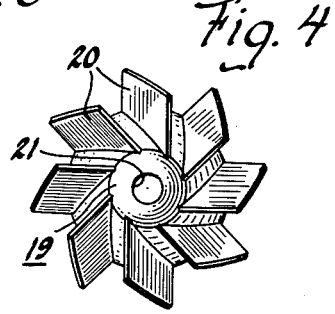
FIGURE 4 is an end view, in elevation, of the axial flow impeller.

A cylindrical filtering member 62 is mounted within the housing 10. The cylindrical member comprises a drum 63, which as shown in FIGURES 1 and 3 has a plurality of circumferentially spaced axially extending slots 64 therein. The internal surface of the drum 63 is smooth as shown in FIGURE 3, while the external periphery of the drum 63 has a plurality of circumferentially spaced, longitudinally extending fins, or ridges, 65 disposed between the slots 64. A filter screen 66, constituting a primary filtering member is secured by any suitable means to the fins 65.

The drum 63 is supported by an annular end member, or partition, 67 which engages an internal shoulder on the housing 10. The partition 67 divides the housing 10 into a primary filtering chamber and a sump chamber. The drum 63 is resiliently maintained in engagement with the member 67 by a plurality of springs, such as indicated by numeral 68, which surround guide pins 69. The springs 68 have their inner ends engaging the drum 63 and the outer ends engaging internal flange 70 of the annular inlet member 11. As seen in FIGURE 1, the drum 63 sealingly engages the internal wall of the housing 10 at its upper end, and the head member 67 sealingly engages the inner wall of the housing 10 at its lower end. Thus, fluid cannot flow directly from the inlet opening 14 to the outlet opening 49, but must flow into the interior of the filtering member 62, through the slots 64, the screen 66 and into an outlet chamber 71 which connects with the outlet opening 49.

The shaft 46 as shown in FIGURES 1 and 3 is formed with an axial passage 72 that connects with a radial passage 73. The radial passage 73 connects with a radial passage 74 in a rotor 75 attached to the shaft 46 by means of a screw 76. The rotor 75 is retained in position by a lower bushing 77 which engages a resilient washer 78 supported on the member 67. The upper end of the rotor 75 is engaged by a stepped annular member 79 having a plurality of apertures 80 by which means the incoming fuel flows to the inlet chamber 81 of the filter member. The annular member 79 is secured to the drum 63 by any suitable means, not shown.

The rotor 75 carries a coupling 82, and coupling 82 in turn carries a back-wash nozzle 83. The back-wash nozzle sealingly and slidably engages the coupling, and is spring biased into engagement with the inner wall of the drum 63 by a spring 84. As seen in FIGURE 1 the back-wash nozzle 83 has a converging inlet opening 85 which is arranged to connect with the slots 64 in the drum 63 during rotation of the nozzle 83 about the inner wall of the drum.

The axial passage 72 in the shaft 46 communicates with a chamber 86 formed by a plate 87 and a cup 88, both of which rotate with the shaft 46. In particular, the cup 88 and the plate 87 are interconnected by a pin 89, and the plate 87 is connected to the shaft 46 by a nut 90. The shaft has a plurality of radial holes 91 connecting with the chamber 86, and the chamber 86 has a single, upwardly inclined outlet opening, or orifice, 92 which communicates with a sump chamber generally designated by the numeral 93. The bottom wall of the sump chamber is formed by a cup-shaped sump element 95 which is detachably connected to the housing 10 by an annular spring clamp 96. The sump chamber 93 connects with a back-wash outlet opening, or port 97.

Figure 6:
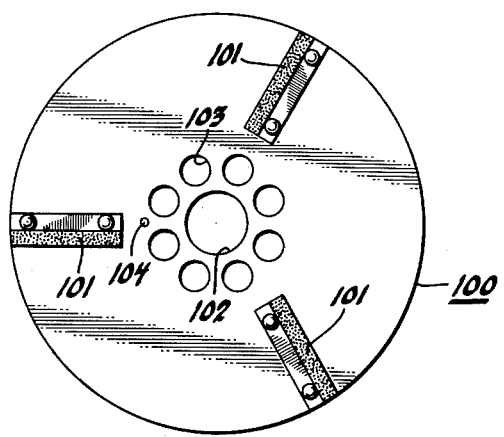
FIGURE 6 is a view in elevation of the back-wash brush plate taken along line 6—6 of FIGURE 1.

The sump chamber 93 is divided into two parts by a back-wash filter plate 98 which is attached to the end member 67 by a plurality of screws 99. The pin 89 also drivingly interconnects the shaft 46 and a brush plate 100 having three circumferentially spaced wire brushes 101 thereon. As seen in FIGURE 6, the brush plate 100 is formed with a central aperture 102 through which the shaft 46 extends, and a plurality of smaller apertures 103 as well as a small hole 104 through which the drive pin 89 extends.

Figure 5:
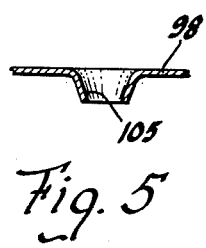
FIGURE 5 is an enlarged sectional view of the back-wash filter plate taken along line 5—5 of FIGURE 1.

As seen in FIGURE 5, the back-wash filter plate 98 is formed with a plurality of frusto conical perforations 105, with a smaller cross-section area of the frusto conical perforations being disposed on the lower side of the filter plate 98 so as to be contacted by the brushes 101 which rotate relative thereto.

Accordingly the back-wash flow from the outlet filter chamber 71 flows through one of the slots 63, through the inlet opening 85 of the nozzle 83, the coupling 82, the opening 74 in the rotor 75 and through the radial passage 73 to the internal bore 72 of the shaft 46. From this point the back-wash flow flows downwardly through the axial bore 72 and through the radial openings 91 to the chamber 86. The back-wash flow then passes through the opening 92 and through the filter plate 98 to the outlet port 97. The outlet port 97 is connected to the inlet side of a pump for supplying fluid to the inlet port 14 of the fuel filter. Accordingly, there is a pressure differential between the fluid in the outlet filter chamber 71 and the sump 93 which causes a portion of the fluid to flow in the reverse path so as to clean sediment from the filter screen 66. In normal operation, this back-wash flow is approximately 1% of the total flow passing through the inlet port 14 of the filter. This back-wash flow is then filtered through plate 98 and returns to the inlet port 14 of the filter with additional fluid from a tank. A substantial portion of sediment removed from the screen 66 by the back-wash flow is removed by the back-wash filter plate 98, and thereafter the sediment is removed from the plate 98 by the brushes 101 and falls into the sump member 95. The sump member 95 can be removed periodically for cleaning the sediment which is collected therein during filtering operation.

The depending flange 106 of the member 67 has three holes 107 therethrough which connect with an annular groove 108 thereof, the annular groove being connected with a passage 109 and the back-wash outlet port 97. In addition, the sump member 95 has attached thereto a cup-shaped baffle member 110 having a plurality of side wall apertures 111 by which means some of the back-wash fluid and sediment removed from the filter plate 98 can pass to the bottom of the sump pump. The baffle 110 confines the discharge of back-wash flow from the orifice 92 which directs the back-wash flow towards the plate 98. In addition, the sediment can fall to the bottom of the sump chamber through the apertures 103 in the brush plate 100. The baffle 110 also has an annular flange 113 radially spaced from the plate 100. It is also pointed out that the axial passage 72 in the shaft 46 is closed at its lower end by a pin 112 so that the back-wash flow can only flow into chamber 86 through the radial openings 91.

Operation of the aforedescribed fuel filter is as follows. Liquid under pressure flowing through the inlet opening 14 will impart rotation to the impeller 19. Accordingly, the shaft 46 will be rotated at a greatly reduced speed through the reduction gearing and shaft 44. The incoming liquid will flow through the openings 80 to the inlet fuel chamber 81 and through the slots 63 to the outlet fuel chamber 71. The filtered liquid will then flow through outlet opening 49. (This flow is depicted by the solid arrows in FIGURE 1.) Rotation of shaft 46 will rotate the back-wash nozzle whereby the nozzle will connect with each slot 63 during each revolution, so that during every revolution of the shaft 46 the entire area of the primary filter media namely the screen 66, will be automatically cleaned by the back-wash flow. The back-wash flow is in turn filtered through plate 98 and then passes through outlet port 97 to the inlet side of the pump for supplying the fluid to the filter. (This flow is depicted by the broken arrows in FIGURE 1.) Since the brush plate 100 is also drivingly connected to the shaft 46, the brushes 101 will remove the sediment separated from the back-wash flow by the plate 98, and this sediment will be collected in the sump member 95. If the screen 65 becomes clogged, the bypass valve 51 will open to directly connect the inlet 14 with the outlet 49.

From the aforegoing it is apparent that the present invention provides a back-wash type self-cleaning filter wherein the power required to rotate the back-wash nozzle is derived from the incoming fluid. In addition, the back-wash flow is itself filtered, and the sediment separated therefrom is collected in a sump. Moreover, the filter is designed so that in the event the primary filtering media becomes clogged, a bypass valve will be opened to interconnect the inlet and outlet ports. In addition, the turbine impeller for actuating the cleaning elements of the filter is designed to operate at a substantially constant speed irrespective of variations in the rate of incoming fluid flow above a predetermined flow rate.

While the form of the embodiment of the invention as herein disclosed constitutes a preferred form, it is to be understood that other forms might be adopted, as may come within the scope of the claims which follow.

What is claimed is as follows:

1. A fluid filter including, a housing having an inlet opening for fluid to be filtered and an outlet opening for filtered fluid, a filter member disposed within the housing between the inlet and outlet openings, rotatable cleaning means for the filtering member disposed within the housing, a nozzle disposed within the housing adjacent one of said openings and having a diverging outlet portion, a rotatable turbine impeller coaxially disposed within the diverging outlet portion of said nozzle so as to be rotated by the flow of fluid therethrough, means interconnecting said turbine impeller and said rotatable cleaning means, and resilient means engaging said turbine impeller permitting axial movement thereof relative to said nozzle so as to maintain a substantially constant speed of impeller rotation during variation in the rate of flow of fluid through said filter above a predetermined flow rate.

2. A fluid filter including, a housing having an inlet for fluid to be filtered and an outlet for filtered fluid, a filter member disposed within said housing between said inlet and said outlet, rotatable cleaning means for said filter member disposed within said housing, a nozzle disposed within said housing having a diverging outlet portion aligned with said inlet, an axial flow impeller coaxially disposed within the diverging outlet portion of said nozzle whereby incoming fluid will impart rotation thereto, means interconnecting said rotatable cleaning means and said impeller including a shaft about which said impeller is rotatably journalled and a spring operatively interconnecting said impeller and said shaft and constituting the driving connection therebetween, said spring permitting axial movement of said impeller wheel relative to said shaft and said nozzle during variations in the fluid flow through said filter so as to maintain the speed of rotation of said impeller substantially constant during variations in the rate of fluid flow through said filter above a predetermined flow rate.

3. A fluid filter including, a housing having an inlet for fluid to be filtered and an outlet for filtered fluid, a cylindrical filtering element disposed within said housing between said inlet and said outlet, rotatable cleaning means for said cylindrical filtering member, a nozzle disposed within said housing having a diverging outlet portion aligned with said inlet, an axial flow impeller coaxially disposed within the diverging outlet portion of said nozzle whereby the flow of fluid through said nozzle will impart rotation to said impeller, and means interconnecting said impeller and said rotatable cleaning means including a shaft and a gear reduction unit, said impeller being rotatably mounted on said shaft and drivingly connected therewith through a spring, said spring permitting axial movement of said impeller so as to control the speed of impeller relative to said nozzle rotation during variation in the flow rate of fluid through said filter.

4. A fluid filter including, a housing having an inlet for fluid to be filtered and an outlet for filtered fluid, a cylindrical filtering member disposed within said housing between said inlet and said outlet, rotatable back-wash fluid cleaning means for said cylindrical filtering member, a filtering element disposed within said housing for the back-wash fluid, rotatable cleaning means for said back-wash filter element, a nozzle disposed within said housing having a diverging outlet portion aligned with said inlet, an axial flow impeller coaxially disposed within a diverging outlet portion of said nozzle so as to be rotated by the flow of fluid through said filter, resilient means engaging said impeller permitting axial movement thereof relative to said nozzle whereby said impeller rotates at a substantially constant speed, means interconnecting said impeller and both of said rotatable cleaning means, an outlet port in said housing for said back-wash fluid, and a removable sump attached to said housing for collecting sediment removed from said back-wash filtering element.

5. A fluid filter including, a housing having an inlet port for fluid to be filtered, an outlet port for filtered fluid and an outlet port for back-wash fluid, a partition in said housing dividing said housing into a primary filtering chamber and a sump chamber, a cylindrical filter member disposed within said primary filtering chamber, rotatable back-wash cleaning means for said cylindrical filtering member, a back-wash fluid filtering member in said sump chamber, a rotatable cleaning means for said back-wash fluid filtering member, a nozzle disposed within said housing having a diverging outlet portion aligned with said inlet portion, an axial flow impeller coaxially disposed within the outlet portion of said nozzle so as to be rotated by incoming fluid, and means including a spring interconnecting said impeller and both of said rotatable cleaning means for continuously rotating said cleaning means during fluid flow through said filter between said inlet port and said outlet port, said spring permitting axial movement of said impeller relative to said nozzle so as to maintain the speed of impeller rotation substantially constant.

6. The filter set forth in claim 5 wherein said back-wash fluid filtering member comprises a perforated plate, the perforations being frusto conical in cross-section.

7. The filter set forth in claim 5 including a cup-shaped baffle disposed within the sump chamber for confining back-wash flow in said sump chamber to a space contiguous to said back-wash filter member.

8. The filter set forth in claim 5 wherein said sump chamber includes a removable end member within which sediment is collected, and wherein said rotatable cleaning means for the back-wash filter member comprises brushing.

References Cited in the file of this patent
UNITED STATES PATENTS

| | | |
|---|---|---|
| 1,158,497 | Hodgkinson | Nov. 2, 1915 |
| 1,402,821 | Wishart | Jan. 10, 1922 |
| 1,734,119 | Evinrude | Nov. 5, 1929 |
| 1,950,466 | Wille | Mar. 13, 1934 |
| 2,053,856 | Weidenbacker | Sept. 8, 1936 |
| 2,132,770 | Weidenbacker | Oct. 11, 1938 |
| 2,275,958 | Hagel | Mar. 10, 1942 |
| 2,300,789 | Kelley | Nov. 3, 1942 |
| 2,858,941 | Darnell | Nov. 4, 1958 |

FOREIGN PATENTS

| | | |
|---|---|---|
| 18,334 | Great Britain | Dec. 14, 1901 |
| 927,810 | Germany | May 16, 1955 |